United States Patent
Adam et al.

(10) Patent No.: US 10,552,241 B2
(45) Date of Patent: Feb. 4, 2020

(54) ACTION RECOMMENDATION TO REDUCE SERVER MANAGEMENT ERRORS

(71) Applicant: International Business Machines Corporation, Armonk, NY (US)

(72) Inventors: Constantin M. Adam, Norwalk, CT (US); Anuradha Bhamidipaty, Yorktown Heights, NY (US); Jayan Nallacherry, Marthahalli (IN); Debasisha K. Padhi, Bangalore (IN); Yaoping Ruan, White Plains, NY (US); Frederick Y.-F. Wu, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 15/189,486

(22) Filed: Jun. 22, 2016

(65) Prior Publication Data
US 2017/0371730 A1    Dec. 28, 2017

(51) Int. Cl.
*G06F 9/46* (2006.01)
*G06F 11/00* (2006.01)

(52) U.S. Cl.
CPC .................................. *G06F 11/004* (2013.01)

(58) Field of Classification Search
CPC .. G06F 11/0709; G06F 9/4881; G06F 11/079; G06F 17/3053
See application file for complete search history.

(56) References Cited

U.S. PATENT DOCUMENTS

| | | | | |
|---|---|---|---|---|
| 2007/0116362 A1* | 5/2007 | Tiede | .................. | G06K 9/00463 382/181 |
| 2014/0136901 A1* | 5/2014 | Butler | .................. | G06F 11/3051 714/38.1 |
| 2014/0317446 A1* | 10/2014 | Best | ..................... | G06F 11/2082 714/6.23 |
| 2016/0197801 A1* | 7/2016 | Thirumalai | ........... | H04L 43/065 709/224 |
| 2016/0232193 A1* | 8/2016 | Bahrs | .................. | H04L 41/5019 |
| 2016/0380811 A1* | 12/2016 | Bhogal | ............... | H04L 41/0803 709/223 |
| 2017/0098086 A1* | 4/2017 | Hoernecke | ............ | G06F 21/577 |
| 2017/0171205 A1* | 6/2017 | Rose | ....................... | H04L 63/10 |
| 2017/0346824 A1* | 11/2017 | Mahabir | ................. | H04L 63/10 |

FOREIGN PATENT DOCUMENTS

| WO | 0221423 A2 | 3/2002 |
|---|---|---|
| WO | 2013036763 A1 | 3/2013 |
| WO | 2013074713 A1 | 5/2013 |

\* cited by examiner

*Primary Examiner* — James J Lee
(74) *Attorney, Agent, or Firm* — Scully, Scott, Murphy & Presser, P.C.; JoAnn Kealy Crockatt

(57) ABSTRACT

An actuator to execute on a server may be automatically selected based on risk of failure and damage to the server. Requirement specification and environment parameters may be received. A subset of actuators may be selected based on a risk threshold from an actuator catalog database storing actuator information and actuator risk metadata associated with a plurality of actuators. The actuator risk metadata may be augmented with risk information. A ranked list of the subset of actuators may be generated based on the actuator risk metadata associated with each actuator in the subset. An actuator in the ranked list may be executed on the server.

20 Claims, 3 Drawing Sheets

ACTION RECOMMENDATION TO REDUCE SERVER MANAGEMENT ERRORS

FIELD

The present application relates generally to computers and computer applications, and more particularly to computer server actuators that autonomously manage computer servers.

BACKGROUND

Server management may include using actuator such as script or tools. To perform a given server management task, operators may need to select an actuator and the parameters for the actuator. When using an actuator, risk of failure or damage should be considered. Selecting the right actuator such that the risk of failure or damage is minimized is a challenging process. Known solutions do not address risk based selection recommendation.

BRIEF SUMMARY

A computer-implemented method and system of selecting an actuator to execute on a server based on risk of failure and damage to the server are presented. The method in one aspect may include receiving requirement specification and environment parameters. The method may also include selecting a subset of actuators based on a risk threshold from an actuator catalog database storing actuator information and actuator risk metadata associated with a plurality of actuators. The method may also include augmenting the actuator risk metadata with risk information. The method may also include generating a ranked list of the subset of actuators based on the actuator risk metadata associated with each actuator in the subset. The method may also include executing an actuator in the ranked list on the server.

A system of selecting an actuator to execute on a server based on risk of failure and damage to the server, in one aspect, may include a hardware processor. A storage device may be operatively connected to the hardware processor. The storage device may store an actuator catalog database storing actuator information and actuator risk metadata associated with a plurality of actuators. The hardware processor may be operable to receive requirement specification and environment parameters. The hardware processor may be further operable to select a subset of actuators based on a risk threshold from the actuator catalog database. The hardware processor may be further operable to augment the actuator risk metadata with risk information. The hardware processor may be further operable to generate a ranked list of the subset of actuators based on the actuator risk metadata associated with each actuator in the subset. The hardware processor may be further operable to cause an actuator in the ranked list to execute on the server.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Actuators automate server management tasks and may include automation scripts and tools that are executable on one or more hardware processors, for example, running or communication with servers. An actuator or a script may have side effects (also referred to as risk of failure or damage). Executing an actuator with incorrect input parameters may result in an undesirable outcome such as server errors. A system, method, computer program product, and/or technique may be provided in the present disclosure that implements an actuator recommender. An actuator recommender in one embodiment of the present disclosure may contain the context of the environment along with risk probability, for example, so that server errors are minimized.

Figure 1:
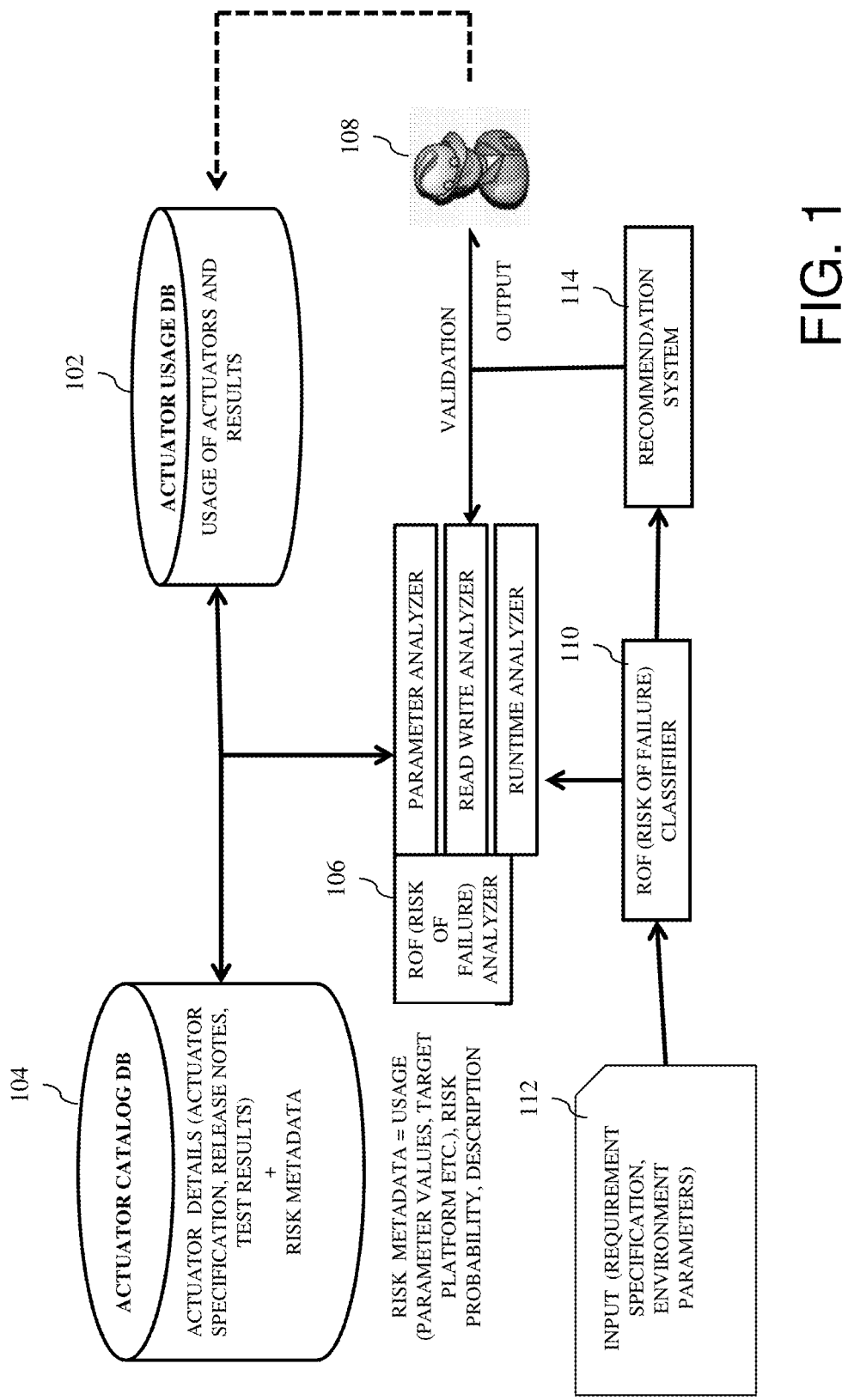
FIG. 1 is a diagram illustrating system components in one embodiment of the present disclosure.

FIG. 1 is a diagram illustrating system components in one embodiment of the present disclosure. An actuator usage database 102 may store usage data and results for a plurality of actuators, for example, on a storage device. Actuator usage data and results are generated based on execution instances of the actuators. For instance, responsive to an actuator executing and generating results, data associated with that execution may be stored or updated in the actuator usage database 102.

An actuator catalog database 104 may store information associated with actuators. For example, for each of a plurality of actuators, information such as actuator specification, release notes, test result, and other information may be stored. In addition, metadata indicating risk information may be stored in the actuator catalog database 104 associated with a respective actuator. Risk metadata may include usage information such as parameter values and target platform, risk probability and description. Consider the rm -rf command in UNIX platform. The parameter values (-rf) imply that the removal is recursive and forced. Risk meta associated with this command may include the description of what the command does, for example, that the command removes an entire directory recursively.

In one embodiment of the present disclosure, the actuator metadata stored in the actuator catalog database 104 may be augmented or updated at regular intervals, with risk of failure or damage information. For example, a risk of failure analyzer 106 executing on one or more hardware processors may update the actuator metadata, for example, by performing design-time analysis at a regular intervals or periodic intervals. The length of intervals may be configurable. Design-time analysis may include a parameter value analysis, parameter option analysis, read-write analysis, runtime platform analysis. Design-time analysis may also include obtaining input from one or more system administrators or like user.

For example, a parameter analyzer may be a component of the risk of failure analyzer 106 and execute on one or more hardware processors to perform parameter value analysis. For example, the parameter analyzer may, for each parameter type of the actuator, substitute the parameter value from a list of known risk and/or failure values. For instance, for a file name parameter, the parameter analyzer may substitute the parameter value with a key system file name. A key system file refers to a file that is indispensable for the system to work. The parameter analyzer identifies the risk probability of the actuator (e.g., high, medium, low) for that value from past actions recorded in a usage database 102. In one aspect, the parameter analyzer may prompt or solicit input from one or more system administrators or the like 108, for example, via a user interface.

Analysis performed by the risk of failure analyzer 106, for example, at a regular interval may also include parameter option analysis. In parameter option analysis, parameter options may be identified which perform operations by "force" or "recurrence" or "multiplicity of inputs". For example, consider a command for remove: rm -rf*. This command forces the deletion, without confirmation (-f flag). It removes recursively all the files in a subdirectory (-r flag). The command accepts a wildcard (*) as a parameter, therefore enabling the command to remove a multiplicity of inputs—several subdirectories. The risk of failure analyzer 106 associates those options with high risk probability.

Analysis performed by the risk of failure analyzer 106, for example, at a regular interval may also include read-write analysis. A read write analyzer may be a component of the risk of failure analyzer 106 and perform the read-write analysis. In read-write analysis in one embodiment, actuators with write operations have a high risk probability than those with read-only commands. For example, the analysis may include parsing of the actuator content. Using regular expressions, and write command lists, the analysis identifies actuators that are not read-only, as well as flags such as -R or -r (recursive in UNIX) -f (force in UNIX), /Q ('quiet' flag in WINDOWS that removes a file or a directory without prompting.

Analysis performed by the risk of failure analyzer 106, for example, at a regular interval may also include runtime platform analysis. A runtime analyzer may be a component of the risk of failure analyzer 106 and perform the runtime platform analysis. In runtime platform analysis, actuators which are not designed for defined platforms or are error-prone (as identified by release notes, actuator specification, test results, and others) are marked with high risk probability.

In one embodiment, risk of failure analyzer 106 may store the updated information in the actuator catalog database. The risk of failure analyzer may also compute a risk probability metric per actuator and usage as an aggregate of the above inputs. The usage of an actuator may include how many times that actuator has been used in the past, and how many times its execution has not helped solve the issue, and/or created additional problems. The risk probability metric may be also stored in the actuator catalog database 104. Risk metadata, e.g., at 104, is updated along with the actuator based on the analysis. In this way, for example, in one embodiment, risk of failure analyzer 106 identifies usages of the actuator which have associated risk. By observing the execution results of an actuator, a risk probability associated with the actuator may be assigned.

In one embodiment of the present disclosure, a user interface may be provided that allow a user to search for an actuator, for example, by specifying a requirement specification and one or more environment parameters. Requirement specification refers to the type of command that the user would like to execute, such as remove, copy, move a file. Examples of environment parameters may include, but are not limited to, target platform and usage, for instance, including parameter values.

A risk of failure classifier 110, for example, may execute on one or more hardware processors, and receive the input requirement specification and environment parameters 112, for example, from a user via the user interface. In one embodiment, the risk of failure classifier 110 may use the input to identify a subset of actuators ordered by risk threshold. For example, the risk of failure classifier 110 may search the actuator catalog database 104 for the actuators meeting a risk threshold. The risk threshold refers to the maximum risk value below which an actuator can be considered acceptable. For example, the actuators with a risk probability metric below a defined risk threshold value may be identified. For instance, the search returns the actuators with a computed risk probability below the defined risk threshold value. The actuators found in the search may be ranked or ordered by their risk probability metric computed based on the analysis performed by the risk of failure analyzer 106. In one embodiment, if an actuator does not have a risk probability metric associated with it, the risk probability metric may be computed by performing the analysis described above, e.g., parameter analysis, parameter option analysis, read-write analysis, and runtime platform analysis. A subset of actuators found that meet a risk threshold, for example, those that have the risk probability metric below a defined threshold, may be input to a recommendation engine 114. For instance, each actuator is associated with a calculated risk probability. The subset of actuators includes only those actuators whose risk probability is less than a pre-defined threshold. For example, risk of failure classifier 110 may identify the subset of actuators ordered by risk threshold and pass the subset to the recommendation system for matching and ranking. The recommendation engine runs on one or more hardware processors and generates a ranked list of actuators along with risk of failure or damage, e.g., the risk probability metric. The recommendation system, for example, matches the actuators with the user specified input, e.g., requirement specification and environment parameters. The generated list of actuators may be output to a user interface, for example, for a user to execute. In another embodiment, the top ranked actuator may be automatically executed.

Figure 2:
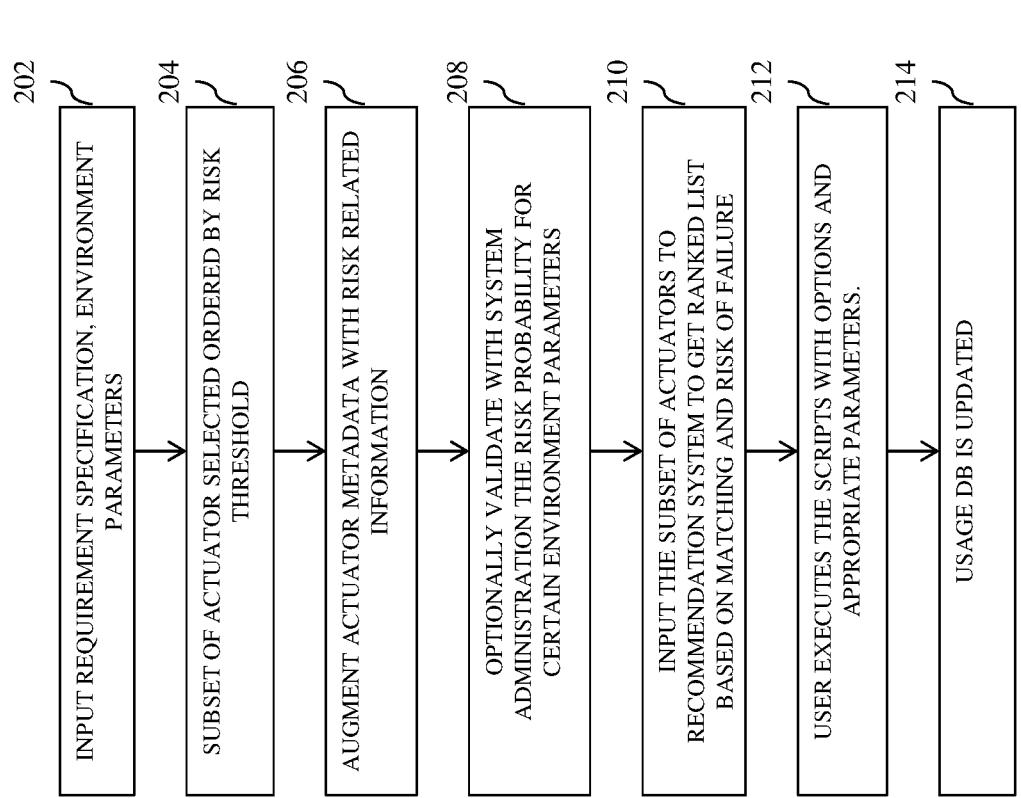
FIG. 2 is a flow diagram illustrating a method of selecting an actuator to execute on a server based on risk of failure and damage to the server in one embodiment of the present disclosure.

FIG. 2 is a flow diagram illustrating a method of selecting an actuator to execute on a server based on risk of failure and damage to the server in one embodiment of the present disclosure. At 202, receiving requirement specification and environment or usage parameters is received, for example, from a user, via a user interface. For example, consider the requirement of deleting a log file for Websphere™ Application Server running on Linux environment. The requirement specification constitutes of the desirable action to be performed (deleting a log file) along with the environment parameters (Websphere application server, install directory) and target platform (Linux server). This specification may be input in a predefined controlled language or through a user interface.

At 204, a subset of actuators may be selected based on a risk threshold, from an actuator catalog database storing actuator information and actuator risk metadata associated with a plurality of actuators. For instance, actuators in the catalog database may be filtered into an initial set based on the risk threshold.

At 206, the actuator risk metadata may be augmented with risk information. For example, as described above with reference to FIG. 1, the actuator risk metadata may be updated based on performing risk of failure analysis. Actuator risk probability metric may be updated for an actuator.

At 208, the risk probability for environment parameters associated with an actuator may be validated with a system administration or another user. For example, the validation may include code review and documentation. A subject matter expert (SME), for instance, may determine whether the actuator contains any dangerous commands/parameters. Another example of a validation may include running the remediation on a virtual machine (VM), and analyzing the state of the VM after the execution. If the state still satisfies a criterion (e.g., users can still login into the VM after the change is made), the actuator is validated.

At 210, a ranked list of the subset of actuators may be generated based on the actuator risk metadata associated with each actuator in the subset. For example, the subset of actuator may be input to recommendation system to generate the ranked list based on matching and risk of failure. For instance, to generate the ranked list, the database of actuators may be searched to identify the list of applicable actuators. The actuators list may be prioritized based on risk associated with each actuator. In the above example of deleting a log file, there may be a plurality of applicable actuators. For a simple example, consider each actuator to be a single command line. The applicable actuators in this case may include (1) "rm <file-name>" (2) "rm -f <file-name>" (3) "rm -rf <file-name>". Once these three actuators are identified, they are ranked based on their risk. In this example case, the order may include (1) then (2) and then (3). The matching or searching of the actuator database is based on input requirement specification and environment parameters. In the above example, the three applicable actuators do not contain the command that remove a file on WINDOWS™ platform as the input specification in this example specified Linux as the target platform.]

At 212, an actuator in the ranked list on the server may be selected and executed on the server.

At 214, a usage database is updated with data associated with the execution of the actuator, for example, as usage data. In addition, risk probability metric stored in the actuator catalog database may be dynamically updated based on usage results.

Figure 3:
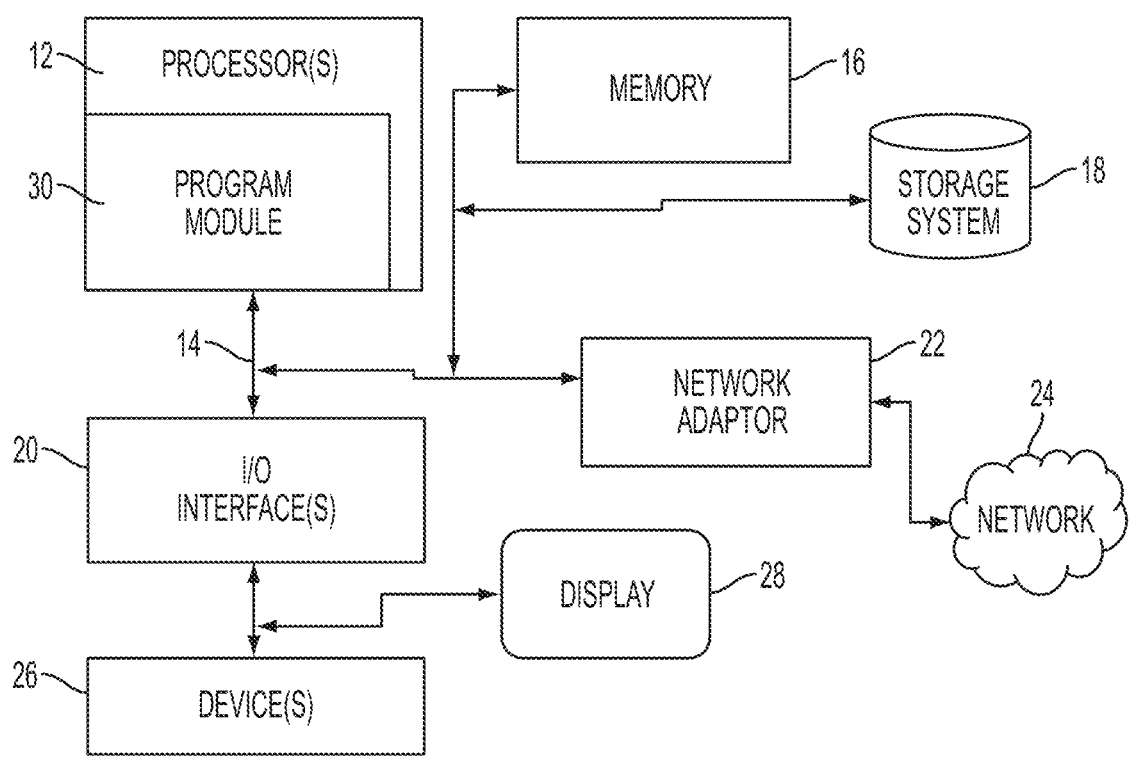
FIG. 3 illustrates a schematic of an example computer or processing system that may implement an actuator selection system in one embodiment of the present disclosure.

FIG. 3 illustrates a schematic of an example computer or processing system that may implement an actuator selection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of selecting an actuator to execute on a server based on risk of failure and damage to the server, comprising:
    receiving requirement specification and environment parameters, the requirement specification including at least a type of a command desired to be executed;
    searching an actuator catalog database storing actuator information and actuator risk metadata associated with a plurality of actuators, for a set of actuators that meet the requirement specification and the environment parameters, the actuator information including at least usage data specifying a number of times that an actuator has been used previously and a number of times the actuator's execution has not helped solve an issue, the actuator risk metadata including at least a description of the actuator's command;
    selecting from the set of actuators, a subset of actuators based on a risk threshold;
    augmenting the actuator risk metadata with risk of damage information determined by performing design-time analysis at intervals;
    generating a ranked list of the subset of actuators based on the actuator risk metadata associated with each actuator in the subset, the ranked list of subset of actuators comprising at least multiples of the same actuators, but each with different parameters; and
    executing an actuator in the ranked list on the server.

2. The method of claim 1, wherein the actuator risk metadata comprises at least a risk probability metric per actuator and usage parameters, the risk probability metric computed by at least analyzing the actuators for detecting parameter values and options that has risk of failure.

3. The method of claim 2, wherein the risk probability metric is further computed by analyzing the actuators for read-only and write operations.

4. The method of claim 3, wherein the risk probability metric is further computed by analyzing the actuators against target runtime platforms that have risk of failure.

5. The method of claim 4, wherein the risk probability metric is further computed by obtaining input from a user.

6. The method of claim 5, wherein the risk probability metric is further computed based on aggregated results of the analyzing the actuators for detecting parameter values and options that has risk of failure, the analyzing the actuators for read-only and write operations, the analyzing the actuators against target runtime platforms that have risk of failure, and the input from the user.

7. The method of claim 2, further comprising dynamically updating the risk probability metric based on usage results of the actuator.

8. A computer program product for selecting an actuator to execute on a server based on risk of failure and damage to the server, the computer program product comprising a computer readable storage medium having program instructions embodied therewith, wherein the computer readable storage medium is not a transitory signal per se, the program instructions readable by a device to cause the device to perform a method comprising:
    receiving requirement specification and environment parameters, the requirement specification including at least a type of a command desired to be executed;
    searching an actuator catalog database storing actuator information and actuator risk metadata associated with a plurality of actuators, for a set of actuators that meet the requirement specification and the environment parameters, the actuator information including at least usage data specifying a number of times that an actuator has been used previously and a number of times the actuator's execution has not helped solve an issue, the actuator risk metadata including at least a description of the actuator's command;
    selecting from the set of actuators, a subset of actuators based on a risk threshold;
    augmenting the actuator risk metadata with risk of damage information determined by performing design-time analysis at intervals;
    generating a ranked list of the subset of actuators based on the actuator risk metadata associated with each actuator in the subset, the ranked list of subset of actuators comprising at least multiples of the same actuators, but each with different parameters; and
    executing an actuator in the ranked list on the server.

9. The computer program product of claim 8, wherein the actuator risk metadata comprises at least a risk probability metric per actuator and usage parameters, the risk probability metric computed by at least analyzing the actuators for detecting parameter values and options that has risk of failure.

10. The computer program product of claim 9, wherein the risk probability metric is further computed by analyzing the actuators for read-only and write operations.

11. The computer program product of claim 10, wherein the risk probability metric is further computed by analyzing the actuators against target runtime platforms that have risk of failure.

12. The computer program product of claim 11, wherein the risk probability metric is further computed by obtaining input from a user.

13. The computer program product of claim 12, wherein the risk probability metric is further computed based on aggregated results of the analyzing the actuators for detecting parameter values and options that has risk of failure, the analyzing the actuators for read-only and write operations, the analyzing the actuators against target runtime platforms that have risk of failure, and the input from the user.

14. The computer program product of claim 9, further comprising dynamically updating the risk probability metric based on usage results of the actuator.

15. A system of selecting an actuator to execute on a server based on risk of failure and damage to the server, comprising:
    at least one hardware processor;
    at least one storage device operatively connected to the at least one hardware processor, the at least one storage device storing an actuator catalog database storing actuator information and actuator risk metadata associated with a plurality of actuators, the actuator information including at least usage data specifying a number of times that an actuator has been used previously and a number of times the actuator's execution has not helped solve an issue, the actuator risk metadata including at least a description of the actuator's command;

the at least one hardware processor operable to receive requirement specification and environment parameters, the requirement specification including at least a type of a command desired to be executed;

the at least one hardware processor operable to search the actuator catalog database, for a set of actuators that meet the requirement specification and the environment parameters;

the at least one hardware processor further operable to select from the set of actuators, a subset of actuators based on a risk threshold from the actuator catalog database;

the at least one hardware processor further operable to augment the actuator risk metadata with risk of damage information determined by performing design-time analysis at intervals;

the at least one hardware processor further operable to generate a ranked list of the subset of actuators based on the actuator risk metadata associated with each actuator in the subset, the ranked list of subset of actuators comprising at least multiples of the same actuators, but each with different parameters; and the at least one hardware processor further operable to cause an actuator in the ranked list to execute on the server.

16. The system of claim 15, wherein the actuator risk metadata comprises at least a risk probability metric per actuator and usage parameters, the risk probability metric computed by at least analyzing the actuators for detecting parameter values and options that has risk of failure.

17. The system of claim 16, wherein the risk probability metric is further computed by analyzing the actuators for read-only and write operations.

18. The system of claim 17, wherein the risk probability metric is further computed by analyzing the actuators against target runtime platforms that have risk of failure.

19. The system of claim 18, wherein the risk probability metric is further computed based on aggregated results of at least the analyzing the actuators for detecting parameter values and options that has risk of failure, the analyzing the actuators for read-only and write operations, the analyzing the actuators against target runtime platforms that have risk of failure, and an input from a user.

20. The system of claim 16, wherein the at least one processor is further operable to dynamically update the risk probability metric based on usage results of the actuator.

* * * * *